United States Patent
Oh

(10) Patent No.: US 12,083,882 B2
(45) Date of Patent: Sep. 10, 2024

(54) METHOD FOR CONTROLLING WHEEL SLIP OF VEHICLE

(71) Applicants: Hyundai Motor Company, Seoul (KR); Kia Corporation, Seoul (KR)

(72) Inventor: Ji Won Oh, Hwaseong-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 126 days.

(21) Appl. No.: 17/866,325

(22) Filed: Jul. 15, 2022

(65) Prior Publication Data
US 2023/0070659 A1  Mar. 9, 2023

(30) Foreign Application Priority Data

Sep. 9, 2021 (KR) .................. 10-2021-0120151

(51) Int. Cl.
*B60K 28/16* (2006.01)
*B60K 1/00* (2006.01)

(52) U.S. Cl.
CPC ............... *B60K 28/16* (2013.01); *B60K 1/00* (2013.01)

(58) Field of Classification Search
CPC ......... B60K 1/00; B60K 28/16; B60W 10/04; B60W 10/06; B60W 10/10; B60W 10/101; B60W 20/00; B60W 30/1819; B60W 30/18172; B60W 2520/28; B60W 2520/26; B60W 2520/10; B60W 2050/0026; B60W 2510/0652; B60W 2510/081; B60W 2510/082; B60W 2510/087; B60W 2710/0666; B60W 2710/083; F16H 61/66; F16H 2057/0012
See application file for complete search history.

(56) References Cited

U.S. PATENT DOCUMENTS

| | | | |
|---|---|---|---|
| 7,106,305 B2 | 9/2006 | Rosenberg | |
| 9,718,460 B2 | 8/2017 | Kawai et al. | |
| 11,625,959 B2 * | 4/2023 | Oh | ........ G07C 5/0808 701/33.7 |

(Continued)

FOREIGN PATENT DOCUMENTS

| | | |
|---|---|---|
| JP | 1994-261418 | 9/1994 |
| JP | 2016-099908 | 5/2016 |

(Continued)

*Primary Examiner* — Logan M Kraft
*Assistant Examiner* — Johnny H Hoang
(74) *Attorney, Agent, or Firm* — MORGAN, LEWIS & BOCKIUS LLP

(57) ABSTRACT

A method for controlling wheel slip of a vehicle includes obtaining operation state information of a driving system, determining the speed of a backlash component between a drive apparatus and a drive wheel of the vehicle based on the obtained operation state information of the driving system, determining a reference speed for controlling wheel slip, determining a control input value for controlling the wheel slip based on a driving system speed, the speed of the backlash component, and the reference speed, using the control input value to determine whether wheel slip occurs, determining a torque correction amount based on the control input value when it is determined that wheel slip has occurred, and correcting a torque command of the drive apparatus according to the torque correction amount.

21 Claims, 7 Drawing Sheets

(56) References Cited

U.S. PATENT DOCUMENTS

| | | | | |
|---|---|---|---|---|
| 2014/0207355 A1* | 7/2014 | Akaho | .................... | B60L 3/108 |
| | | | | 701/70 |
| 2014/0288758 A1* | 9/2014 | Suzuki | ................ | B60L 15/2009 |
| | | | | 701/22 |
| 2016/0221467 A1* | 8/2016 | Suzuki | ................ | B60L 15/2045 |
| 2018/0056811 A1* | 3/2018 | Iwahana | ................. | H02P 23/30 |
| 2020/0088756 A1* | 3/2020 | Oh | ........................ | G01P 13/045 |
| 2020/0247244 A1* | 8/2020 | Yamane | ................. | B60L 3/102 |
| 2021/0086622 A1* | 3/2021 | Zhang | ....................... | B60L 7/26 |

FOREIGN PATENT DOCUMENTS

| | | |
|---|---|---|
| KR | 10-1090708 | 9/2010 |
| KR | 10-2011-0016285 | 2/2011 |
| KR | 10-2015-0005171 | 1/2015 |
| KR | 10-1499995 | 2/2015 |
| KR | 10-2019-0138118 | 12/2019 |
| KR | 10-2020-0035295 | 4/2020 |
| KR | 10-2020-0050027 | 5/2020 |
| KR | 10-2020-0116579 | 10/2020 |
| KR | 10-2021-0020189 | 2/2021 |
| WO | WO 2013/137547 | 9/2013 |

\* cited by examiner

METHOD FOR CONTROLLING WHEEL SLIP OF VEHICLE

CROSS REFERENCE TO RELATED APPLICATION

The present application claims priority to Korean Patent Application No. 10-2021-0120151, filed Sep. 9, 2021, the entire contents of which is incorporated herein for all purposes by this reference.

BACKGROUND OF THE INVENTION

Field of the Invention

The present invention relates to a method for controlling wheel slip of a vehicle, and more particularly, to a method for controlling wheel slip of a vehicle, which prevents control performance from being decreased due to a backlash component between a driving motor and a wheel in the vehicle, ensuring stability and driving performance of the vehicle.

Description of Related Art

In general, as an electronic control system for improving safety while driving a vehicle, an Anti-lock Brake System (ABS) that prevents brake from being locked due to wheel slip on a slippery road surface during vehicle braking, a Traction Control System (TCS) that prevents wheel slip by controlling the driving force or braking force when the vehicle starts or accelerates rapidly, an Electronic Stability Program (ESP) for stably controlling a vehicle posture, and the like are known.

Among them, the TCS is an active safety apparatus that prevents vehicle spin by preventing excessive slip of a drive wheel during vehicle start or acceleration on a low-friction road surface or an asymmetric road surface and increases vehicle start-up and acceleration performance and steering stability.

If excessive driving force is generated so that wheel slip occurs when a vehicle starts or accelerates on a slippery road surface, a TCS controls driving force (driving torque) or braking force (braking torque) of the vehicle to control the speed of the drive wheel, and through this, maximizes the acceleration of the vehicle.

Here, the driving force of the vehicle may mean a force generated by a torque output from a drive apparatus and the drive apparatus may be a motor (a pure electric vehicle, a fuel cell vehicle), an engine (internal combustion engine vehicle), or a motor and an engine (hybrid vehicle).

For example, in a motor-driven vehicle such as a pure electric vehicle, a fuel cell vehicle, and a hybrid vehicle, a target drive wheel speed capable of obtaining the optimal driving force from the drive wheel is determined according to the amount of slip generated between the drive wheel and the road surface, the friction coefficient of the road surface, and the like and motor torque is controlled to follow the target drive wheel speed.

Furthermore, when the vehicle turns on a corner road, the motor torque is reduced to prevent the vehicle's instability so that the vehicle can turn safely.

During operation of a TCS, the torque is adjusted in a direction to reduce wheel slip by determining a wheel slip rate based on the actual vehicle speed of a driving vehicle, and to determine the wheel slip rate, it is necessary to know the actual vehicle speed (vehicle body reference speed) and the wheel speed, which are real-time information.

For example, the slip ratio ($\lambda$) of the wheel may be determined as follows.

$$\lambda(\%)=(Vveh-Vwhl)/Vveh \times 100$$

Wherein, 'Vveh' is the vehicle speed, that is, the vehicle body speed, which is the reference speed required to determine the slip ratio, and the present reference speed has the meaning of vehicle speed in a non-slip state and is essential information for the operation of a TCS.

'Vwhl' is the wheel speed which is obtained through a wheel speed sensor.

Accordingly, since the reference speed is absolutely necessary for the operation of a TCS, accurate estimation of the reference speed is required to implement accurate and appropriate control performance.

In general, as the reference speed, the reference speed may be obtained by use of the wheel speed of a non-driven wheel or by use of a Gravity sensor (G sensor) for detecting longitudinal acceleration, or a vehicle speed obtained through Global Positioning System (GPS) reception information may be used as the reference speed, and furthermore, a yaw rate sensor is used to correct the reference speed. On the other hand, despite the introduction of various electronic control systems to a vehicle, the behavior of the vehicle is ultimately limited due to the limit of road friction force.

This is because the behavior of the vehicle is obtained through frictional force with a road surface through tires, and therefore, how effectively the frictional force is used becomes an important factor in determining the behavior of the vehicle.

The maximum road friction force is influenced in a complex way by road surface characteristics, longitudinal/lateral tire slip, tire vertical load, and the like, and in general, the larger the slip size in comparison with a predetermined amount, the more the available friction force decreases.

Therefore, it is important to limit the tire slip of the wheel to maintain effective longitudinal/lateral friction and the electronic control systems such as an ABS or a TCS play the present role in the vehicle.

However, in well-known ABS or TCS control methods, it is difficult to maintain an ideal control performance due to reasons such as control cycle delay, wheel-in-wheel signal processing to prevent malfunction, and the like, so that a slip condition that produces the maximum friction force on a road cannot be maintained and a significantly large slip occurs.

In the end, due to the characteristic of the tire that the tire friction force is lower than the maximum road friction force when the tire slip ratio of the wheel is high, the maximum road friction force cannot be used in the limiting situation and the low friction force is used, so that the stability and performance of the vehicle cannot be effectively exhibited.

Recently, as a method for controlling wheel slip in electrified vehicles driven by motors, methods using the torque and speed of a motor rather than using the actual vehicle speed (vehicle body reference speed) and the wheel speed are being proposed in consideration of the fast behavior characteristics of the motor.

These methods have the advantage that it does not require the absolute speed or reference value of the vehicle, so it may be effective even in the e-4WD system.

However, since the speed information of the motor is used, a backlash component between the motor and the wheel is involved in a control amount, so that a situation difficult to accurately control wheel slip may occur.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling wheel slip of a vehicle, which prevents control performance from being decreased due to a backlash component between a driving motor and a wheel in the vehicle, ensuring stability and driving performance of the vehicle.

To achieve the above object, various aspects according to various aspects of the present invention provide a method for controlling wheel slip of a vehicle, the method including: obtaining, by a controller, operation state information of a driving system including a drive apparatus of driving a vehicle; determining, by the controller, the speed of a backlash component between the drive apparatus and a drive wheel of the vehicle based on the obtained operation state information of the driving system; determining, by the controller, the reference speed for controlling the wheel slip; determining, by the controller, a control input value for controlling the wheel slip based on a driving system speed included in the obtained operation state information of the driving system, the determined speed of the backlash component, and the determined reference speed; using, by the controller, the determined control input value to determine whether the wheel slip occurs; determining, by the controller, a torque correction amount based on the control input value when the controller concludes that the wheel slip has occurred; and correcting, by the controller, a torque command of the drive apparatus according to the determined torque correction amount.

Accordingly, the method for controlling the wheel slip of a vehicle according to various exemplary embodiments of the present invention removes the backlash component from the driving system speed to controlling the wheel slip, effectively preventing control performance from being decreased due to the backlash component and ensuring the stability and driving performance of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
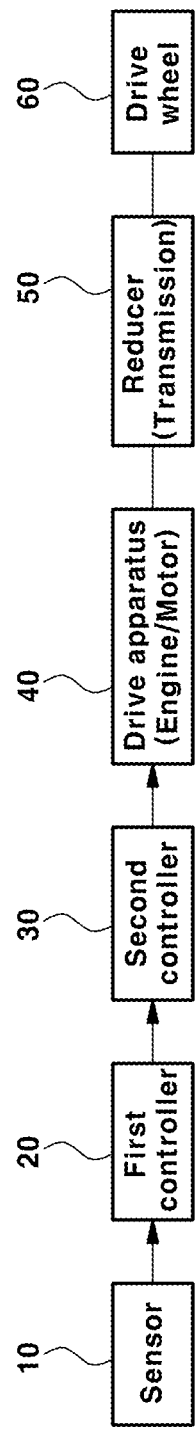
FIG. 1 is a block diagram illustrating a configuration of an apparatus configured for performing wheel slip reduction control and driving force control in consideration of backlash according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, the structural or functional description specified to exemplary embodiments according to the concept of the present invention is directed to describe the exemplary embodiments of the present invention, so it should be understood that the present invention may be variously embodied, without being limited to the exemplary embodiments.

Embodiments described herein may be changed in various ways and various shapes, so specific embodiments are shown in the drawings and will be described in detail in the present specification. However, it should be understood that the exemplary embodiments according to the concept of the present invention are not limited to the exemplary embodiments which will be described hereinbelow with reference to the accompanying drawings, but all of modifications, equivalents, and substitutions are included in the scope and spirit of the present invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent" or "directly adjacent" should be construed in the same manner.

The terminology used herein is for describing various exemplary embodiments only and is not intended to limit the present invention. Singular forms are intended to include plural forms unless the context clearly indicates otherwise. It will be further understood that the terms "comprises" or "comprising" used in the exemplary embodiment, specify the presence of stated features, steps, operations, components, parts, or a combination thereof, but do not preclude the presence or addition of one or more other features, numerals, steps, operations, components, parts, or a combination thereof.

The present invention relates to a method for controlling wheel slip of a vehicle, and more particularly, to a method for controlling wheel slip of a vehicle, which prevents control performance from being decreased due to a backlash component between a driving motor and a wheel in the vehicle, ensuring stability and driving performance of the vehicle.

To the present end, the exemplary embodiment of the present invention may control wheel slip by use of driving system speed information from which the backlash component is removed after the speed of the backlash component is removed from a driving system speed.

The method for controlling wheel slip according to various exemplary embodiments of the present invention are useful for an eco-friendly vehicle using a motor as a vehicle driving source, which is a drive apparatus configured for driving the vehicle, that is, motor-driven vehicles such as a battery Electric Vehicle (BEV), a Hybrid Electric Vehicle (HEV), and a Fuel Cell Electric Vehicle (FCEV).

In a known wheel slip control method, in particular, a wheel slip control method that controls the wheel slip of a vehicle using motor speed information, a phenomenon in which the speed of the motor rises abruptly from a reference value is defined as wheel slip, a corresponding torque correction amount is determined, a motor torque command is corrected by use of the determined torque correction amount, and thus the wheel slip of the vehicle is reduced.

However, the sudden increase of the speed of the motor from the reference value occurs not only when the wheel slip occurs but also when backlash impact occurs. Therefore, a phenomenon of unnecessarily correcting a driving force command (motor torque command) in a backlash generation section may occur even when the wheel slip does not occur, and as a result, the starting performance of the vehicle may deteriorate or vibration may occur.

Accordingly, to solve the above problem, the present invention suggests a method for determining a speed component due to backlash in advance and removing the determined value from the speed of the motor. In the present way, it is possible to prevent the backlash component from being included in the speed of the motor information used for controlling wheel slip, the wheel slip is controlled by classifying and determining the phenomenon in which the speed of the motor rises abruptly from the reference value due to only the wheel slip phenomenon, and thus the wheel slip may be effectively prevented or controlled.

Hereinbelow, the exemplary embodiments of the present invention will be described in detail with reference to accompanying drawings.

FIG. 1 is the block diagram illustrating a configuration of an apparatus configured for performing wheel slip reduction control and driving force control in consideration of backlash according to various exemplary embodiments of the present invention.

In the following description, driving force is a force generated by a drive apparatus 40 for driving a vehicle, and may be a force which is a sum of forces acting between tires of drive wheels 60 of the vehicle and a road surface. In other words, the driving force may include the force generated in the drive wheel 60 by the drive apparatus 40 and it may be said that the force generated in the drive wheel 60 is due to the torque applied to the drive wheel 60 from the drive apparatus (e.g., a motor 40).

If the drive apparatus 40 of the vehicle is a motor, the torque applied to the drive wheel 60 is a driving torque output when the motor is driven or is a regenerative braking torque by the motor during regeneration. In the instant case, the driving force is a driving force of a concept including not only a driving force due to the torque output when the motor is driven but also a regenerative braking force when the motor is regenerated.

Furthermore, the control of the driving force may be performed by controlling the torque of the drive apparatus 40, wherein the torque is a torque applied to the drive wheel 60 and means both the driving torque by the motor and the regenerative braking torque by the motor. Furthermore, in the following description, 'torque' and 'torque command' may be replaced with 'driving force' and 'driving force command'.

Referring to FIG. 1, an apparatus of performing wheel slip reduction control and driving force control according to various exemplary embodiments of the present invention may include: a first controller 20 configured to determine and output a torque command of the drive apparatus 40 from vehicle driving information; a second controller 30 configured to control the operation of the drive apparatus 40 according to the torque command received from the first controller 20; and a drive apparatus 40 whose operation (torque output) is controlled by the second controller 30 as a driving source for driving the vehicle.

Here, as shown in FIG. 1, the drive apparatus 40 may be a motor in an electric vehicle. The torque and rotational force output by the motor are transmitted to the drive wheel 60 through a reducer 50. Moreover, the drive apparatus 40 may be an engine and a motor, and torque and rotational force output by the engine and the motor are transmitted to the drive wheel through a transmission 50.

Furthermore, the torque command for controlling the operation of the drive apparatus 40 is determined and generated based on vehicle driving information collected in the vehicle while driving, wherein the vehicle driving information may be sensor detection (measurement) information which is detected by a sensor 10 to be input to the first controller 20 through the vehicle network.

The sensor 10 for detecting the vehicle driving information may include: an accelerator pedal sensor (APS) detecting a driver's accelerator pedal input value; a brake pedal position sensor (BPS) detecting a driver's brake pedal input value; a sensor configured for detecting a driving system speed; and a sensor configured for detecting a vehicle speed. A key part of the method for controlling wheel slip of a vehicle according to various exemplary embodiments of the present invention are a method for processing the driving system speed which is measured by the sensor during vehicle operation to be used for wheel slip prevention control.

Here, the driving system speed may be a rotation speed of the drive apparatus 40 of the driving system for driving the vehicle. Further, the rotation speed of the drive apparatus 40 may be the rotation speed (speed of the motor) of the motor. In the instant case, the sensor for detecting the speed of the driving system is a sensor for detecting the rotation speed of the motor, which may be a conventional resolver for detecting the position of a rotor of the motor. Alternatively, the rotation speed of the drive apparatus 40 may be the rotation speed of the engine (engine speed), and in the instant case, the sensor for detecting the driving system speed may be a conventional engine revolutions per minute (RPM) sensor for detecting the rotation speed of the engine.

The driving system speed may be the rotation speed (wheel speed) of a wheel connected to the drive apparatus 40 to transmit power of the driving system, that is, a drive wheel 60, and in the instant case, the sensor for detecting the driving system speed may be a sensor for detecting the rotation speed of the drive wheel.

Moreover, the driving system speed may be another rotation speed in the driving system which is related to the rotation speed (wheel speed) of the drive wheel 60. For example, the driving system speed may be the rotation speed of an integrated starter & generator (ISG), which is one of the apparatuses simultaneously rotated by receiving the rotational force of the drive apparatus 40 from the driving system together with the drive wheel 60. The ISG is an apparatus which is connected to an engine, which is a drive apparatus, to transmit power to start the engine or generate power using the rotational force of the engine. Otherwise, the driving system speed may be the input shaft rotation speed or the output shaft rotation speed of the transmission 50 or may be the rotation speed of a driveshaft.

Furthermore, the sensor for detecting the vehicle speed may be also a wheel speed sensor. Obtaining the vehicle speed information from a signal of the wheel speed sensor is a well-known technology in the art, and thus a detailed description thereof will be omitted.

As sensor detection information detected by the sensor 10, a driver's accelerator pedal input value (APS value), a brake pedal input value (BPS value), the rotation speed of the drive apparatus 40, the vehicle speed, and the like may be selectively used as vehicle driving information for determining and generating the torque command.

In the vehicle driving information, the accelerator pedal input value and the brake pedal input value may be called driving input information of a driver and the rotation speed (speed of the motor, etc.) of the drive apparatus 40 and the vehicle speed detected by the sensor 10 may be called status information.

Alternatively, the vehicle driving information may be information determined by the first controller 20 by itself or information (e.g., required driving force information) input from another controller (e.g., ADAS controller) in the vehicle to the first controller 20 through the vehicle network. In the instant case, the first controller 20 may be a vehicle control unit (VCU) or a hybrid control unit (HCU) that generates a torque command based on vehicle driving information in a conventional vehicle.

A method for determining and generating a torque command for controlling the operation of the drive apparatus 40 from vehicle driving information collected from a vehicle and a process thereof are well-known in the art, and thus a detailed description thereof will be omitted.

When the torque command is determined and output by the first controller 20, the second controller 30 receives the torque command to control the operation of the driving apparatus 40 according to the received torque command. Accordingly, while the power of the drive apparatus 40 which is controlled and output according to the torque command is transmitted to the drive wheel 60 through the reducer 50, the vehicle may be driven.

The second controller 30 may be a motor control unit (MCU) that drives the motor, which is the drive apparatus 40, through an inverter according to the torque command controls the operation of the motor. The second controller 30 may include an engine controller (engine control unit, ECU) that controls the operation of the engine according to the torque command together with the motor controller.

In the above description, a control subject includes the first controller and the second controller, but a wheel slip control process according to various exemplary embodiments of the present invention may be performed by one integrated control element instead of a plurality of controllers.

In the instant case, both one integrated control element and the plurality of controllers may be collectively referred to as a controller, and the wheel slip control process of a vehicle according to various exemplary embodiments of the present invention described below may be performed by the present controller. That is, the controller may refer to both the first controller and the second controller.

When the driving system speed, particularly the speed of the motor (rotation speed of a drive motor) is measured by the sensor, the measured motor speed information includes components due to backlash and shaft torsion generated by the torque output of the motor. Accordingly, it is effective to determine and control wheel slip based only on a pure motor speed after removing the speed component due to the backlash and the shaft torsion from the motor speed information measured by the sensor and used for wheel slip prevention control.

Figure 2:
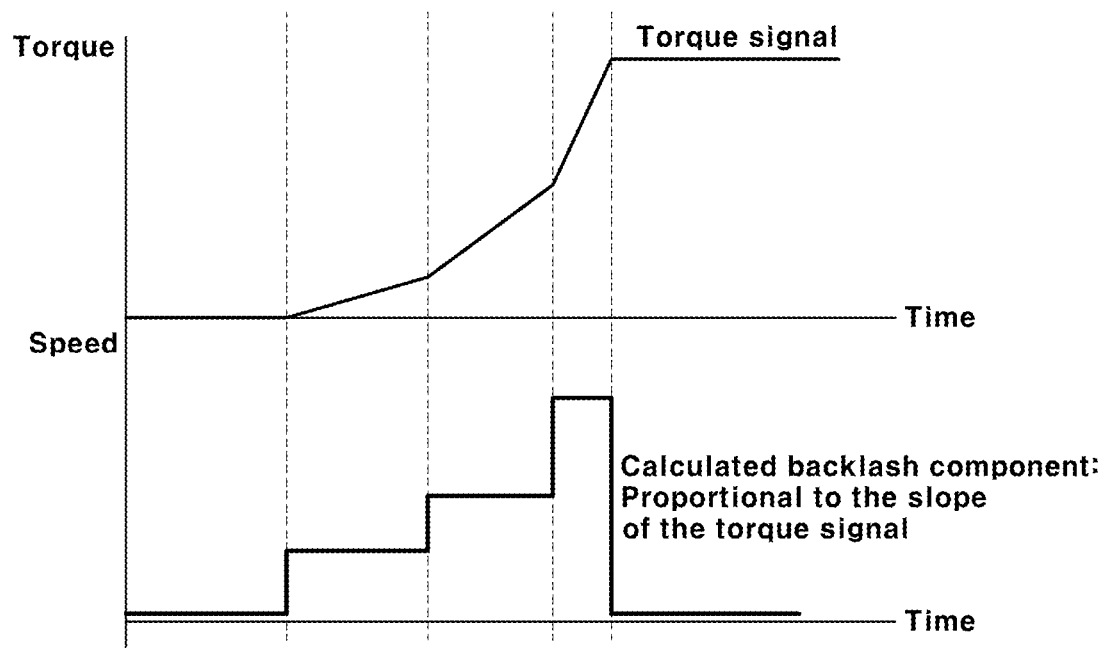
FIG. 2 and FIG. 3 are diagrams for explaining a method for determining a backlash component in various exemplary embodiments of the present invention.
Figure 3:
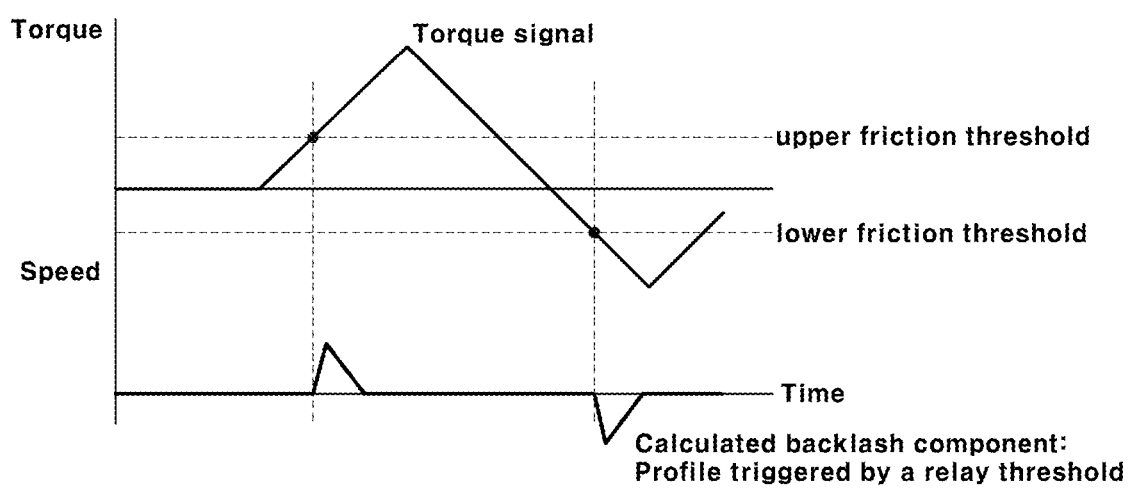

To use only the pure motor component for wheel slip suppression and reduction control after removing a speed component due to the backlash and the shaft torsion in the present way, a process of determining a backlash component, a process of performing backlash compensation for the speed of the motor, and a process of determining and controlling wheel slip based on the compensated speed of the motor should be performed in the controller. FIG. 2 and FIG. 3 are diagrams for explaining a method for determining the backlash component in various exemplary embodiments of the present invention. In various exemplary embodiments of the present invention, a value obtained by one of the following methods may be used as a determined backlash value or a value obtained by combining values obtained by each of two or more of the following methods by a predetermined method may be used as the determined backlash value.

The combined value may be a value summed by applying a weight. That is, the determined backlash value may be obtained as a value which is obtained by respectively multiplying values obtained by two or more methods among the following methods and weights set for the methods and summing all the multiplied values.

In various exemplary embodiments of the present invention, the determined backlash value, that is, the backlash value determined as described above may be defined as a speed and in the instant case, the determined backlash value is a speed value corresponding to the backlash component. The speed value corresponding to such a backlash component may be obtained by the following method. In a first method, the backlash value (the speed value corresponding to the backlash component) may be obtained from the operation state information of the driving system in the controller. Here, the operation state information of the driving system may include at least one of the torque of the drive apparatus 40 (e.g., motor torque), the gradient of torque change (torque change rate) of the drive apparatus, the speed of the driving system (e.g., speed of the motor), and the temperature of the driving system (e.g., temperature of the motor), and the backlash value may be obtained from a map using the at least one values as input variables in the controller. For example, the torque of the drive apparatus may be the torque command of the drive apparatus determined based on the vehicle driving information in the controller, and this may be a motor torque command. The drive torque may be a torque estimation value by a predetermined estimation process or a torque measurement value by a sensor.

As a second method, as shown in FIG. 2, the controller utilizes the torque of the drive apparatus 40 as the operation state information of the driving system, and more specifically, the backlash value may be obtained by multiplying a preset proportional constant and the change slope (change rate) of the torque command of the drive apparatus. Here, the proportional constant may be a torsional stiffness model constant. Referring to FIG. 2, it may be seen that the backlash value is determined as a value proportional to the slope of a torque signal.

As a third method, the backlash value may be obtained as a value determined by a preset gear backlash model in the controller. At the instant time, as shown in FIG. 3, the torque signal of the drive apparatus 40, which is the operation state information of the driving system, is input as backlash value information so that a backlash speed profile (backlash value profile) may be obtained from a relay function having a friction torque threshold as backlash state information.

In other words, an upper friction threshold and a lower friction threshold are set in the controller in advance and a backlash velocity profile triggered by a relay threshold may be obtained so that the value of the backlash velocity profile may be used as the backlash value.

Referring to FIG. 3, it may be seen that a speed profile having a type which is increased/decreased when the motor torque reaches the upper friction threshold and the lower friction torque threshold is set in the controller. In other words, a backlash speed profile having a type that starts to change to a set slope to reach a set peak value when the motor torque reaches the upper friction threshold and the lower friction threshold and then changes to another set slope to be restored to an initial value may be set in the controller.

Figure 4:
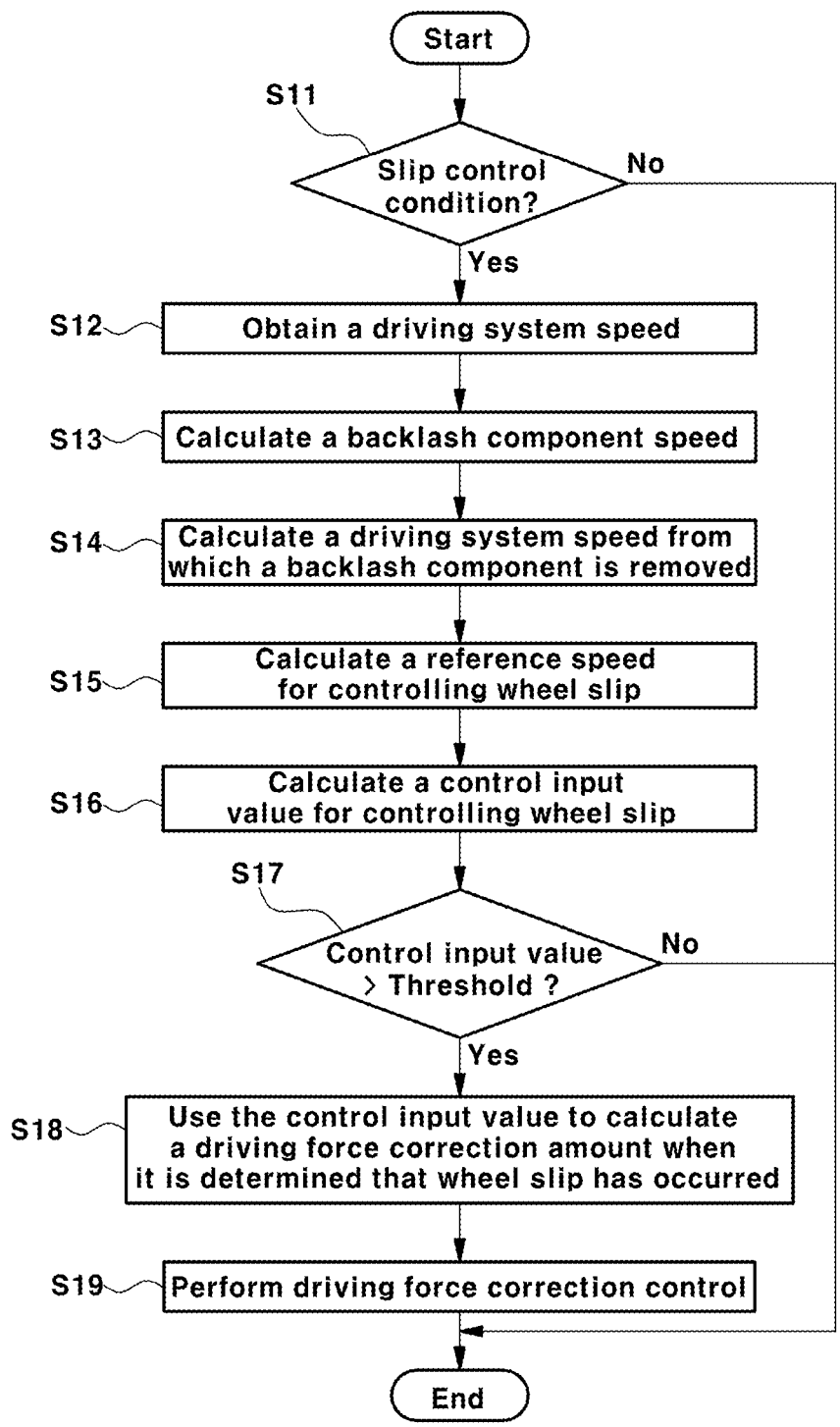
FIG. 4, FIG. 5 and FIG. 6 are flowcharts illustrating various embodiments of a method for compensating for backlash and a method for controlling wheel slip in various exemplary embodiments of the present invention.
Figure 5:
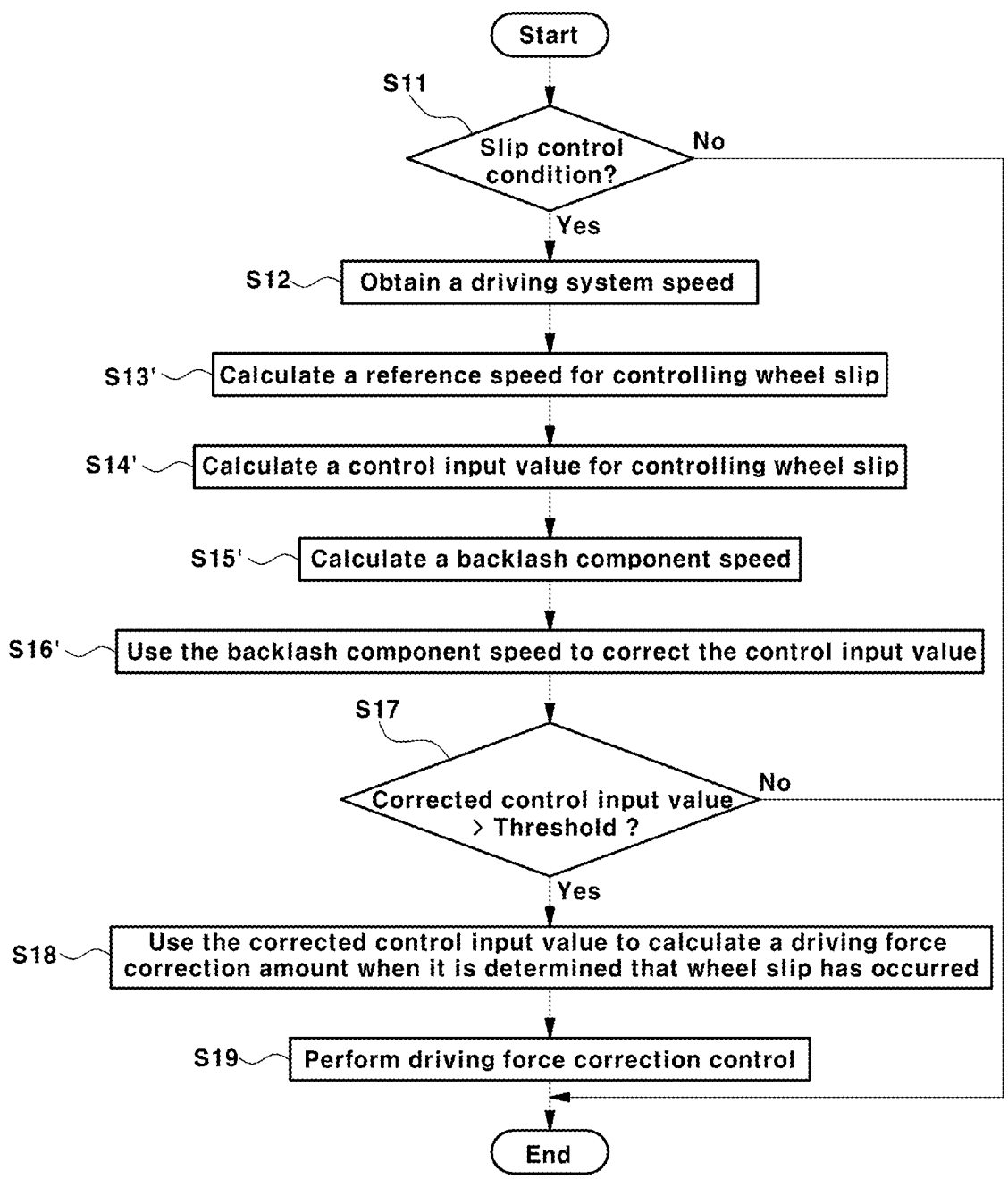
Figure 6:
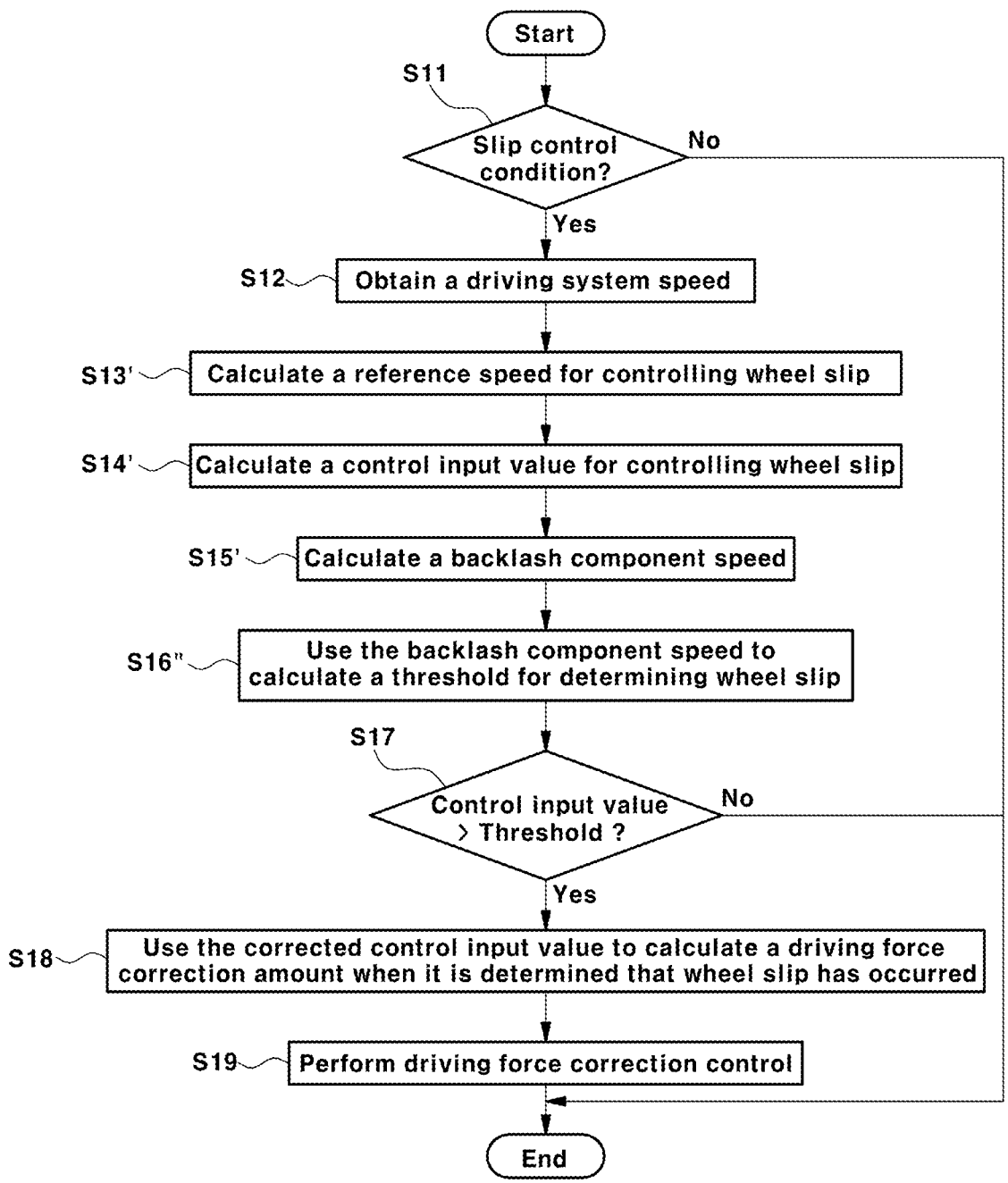

According to various exemplary embodiments of the present invention, one of the following three methods may be selectively used as a method of compensating for backlash of a speed of the motor for controlling wheel slip. FIG. 4, FIG. 5 and FIG. 6 are flowcharts illustrating various embodiments of a method for compensating for backlash and a method for controlling wheel slip according to various exemplary embodiments of the present invention. First, a first method for compensating for backlash will be described with reference to FIG. 4. The method for compensating for backlash shown in FIG. 4 is a method for performing compensation by subtracting the speed corresponding to the backlash component (the speed of the backlash component) from the driving system speed information before the compensation.

As one of the methods for compensating for backlash, the speed of the motor is corrected using the determined speed of the backlash component, and at the instant time, the speed of the motor is compensated such that the determined speed of the backlash component (the final determined backlash value) is subtracted from a pre-correction motor speed.

In more detail, as shown in FIG. 4, when the known slip control condition is satisfied (S11), the controller is configured to obtain the operation state information of the driving system in real-time through the sensor 10 (S12). The real-time operation state information of the driving system may include the torque of the drive apparatus 40 and the speed of the driving system and may further include a temperature of the driving system.

For example, the torque of the drive apparatus 40 may be a motor torque command, the driving system speed may be a speed of the motor, and the temperature of the driving system may be a temperature of the motor. FIG. 4 shows that driving system speed information among the operation state information is obtained. Accordingly, the controller is configured to determine the speed of the backlash component (which is the determined backlash value) as described above (S13) and removes the determined speed of the backlash component from the driving system speed to determine the driving system speed from which the backlash component is removed (S14). In other words, the driving system speed is compensated by subtracting the determined speed value of the backlash component from the driving system speed measured by the sensor 10.

Hereafter, the controller is configured to control wheel slip by use of the driving system speed from which the backlash component is removed. In other words, the controller is configured to determine a reference speed for controlling wheel slip (S15) and determines a speed error value, which is a difference between the compensated driving system speed and the reference speed, as a control input value for controlling the wheel slip (S16). Since a method for determining the reference speed for controlling wheel slip is a well-known technical matter, a description thereof will be omitted.

Accordingly, the controller is configured to compare the control input value, which is the speed error value determined as described above, with a preset threshold value (S17). At the instant time, when the control input value, which is the speed error value, exceeds the threshold value, the controller is configured to determine that wheel slip of the vehicle has occurred, and determines a torque (driving force) correction amount (S18).

The torque correction amount may be, in the controller, determined as a value corresponding to the speed error value, which is the control input value, or a value corresponding to a difference value obtained by subtracting the threshold value from the speed error value by setting data. In the instant case, the setting data of the controller may be a map or formula capable of using the speed error value or a difference value obtained by subtracting the threshold value from the speed error value as an input variable to determine a torque correction amount corresponding to the speed error value or the difference value.

When the torque correction amount is determined as described above, the controller is configured to correct the torque command of the drive apparatus 40 by the determined torque correction amount and performs correction control (driving force correction control) that controls the operation of the driving apparatus 40 according to the corrected torque command (S19). Next, a second method for comping for backlash will be described with reference to FIG. 5. In the following description, the speed of the backlash component will be abbreviated as 'backlash speed'.

The method for compensating for backlash as shown in FIG. 5, the controller utilizes the pre-correction driving system speed information to determine a control input value for controlling the wheel slip, subtracts the backlash compensation amount determined from the backlash speed or a function value of the backlash speed from the determined control input value to compensate the control input value, and utilizes the compensated control input value. In other words, the control input value compensated after the control input value is compensated by use of the backlash speed is used for controlling wheel slip. In more detail, as shown in FIG. 5, the controller is configured to obtain the real-time driving system speed information through the sensor 10 (S12) when the known slip control condition is satisfied (S11). For example, the driving system speed may be the speed of the motor.

The controller is configured to determine the reference speed for controlling wheel slip (S13') and utilizes the obtained driving system speed to determine the control input value (S14'). In the instant case, the control input value may be the speed error value which is the difference value between the obtained driving system speed and the determined reference speed.

The control input value may be a driving system equivalent inertia value determined by use of the obtained driving system speed and the torque command of the driving system. A method of determining the driving system equivalent inertia value based on the driving system speed and the torque command is included in Korean Patent Application No. 10-2021-0014821 (2021 Feb. 10.) filed by the present applicant. Otherwise, the control input value may be an amount of wheel slip obtained from the obtained driving system speed and the determined reference speed or an error of an observation speed obtained from a driving system model by use of the driving system speed information and the torque command value.

The controller is configured to determine the speed of the backlash component, that is, the backlash speed as described above (S15'). Accordingly, the controller utilizes the determined backlash speed to correct the control input value for controlling the wheel slip (S16'). In other words, when the control input value is a speed error value which is the difference between the driving system speed and the reference speed, the controller utilizes the backlash speed as a backlash correction amount to correct the control input value that subtracts the backlash speed, which is the backlash correction amount, from the speed error value, which is the control input value, and utilizes the control input value in the wheel slip control process.

Alternatively, if the control input value is not the speed error value but the equivalent inertia value or the control input variable, such as an amount of wheel slip or an error of the observed speed, the controller is configured to correct the control input value that subtracts the backlash correction amount determined as the function value of the backlash speed from the control input value and then utilizes the corrected control input value in wheel ship control. To determine the backlash correction amount, a function expression capable of determining the backlash correction amount by use of the backlash speed as an input variable may be used.

Hereafter, during the wheel slip control process, the controller is configured to compare the corrected control input value with a preset threshold (S17). When the corrected control input value exceeds the threshold value, the controller is configured to determine that the vehicle is in a state of wheel slip and determines the torque (driving force) correction amount (S18).

The torque correction amount may be, in the controller, determined as a value corresponding to the corrected control input value or a value corresponding to a difference value, which is obtained by subtracting the threshold value from the corrected control input value, by setting data. In the instant case, the setting data of the controller may be a map or formula capable of using the corrected control input value or the difference value subtracting the threshold from the corrected control input value as an input variable to obtain the torque correction amount corresponding to the control input value or the difference value.

When the torque correction amount is determined as described above, the controller is configured to correct the torque command of the driving apparatus 40 by the determined torque correction amount, and then performs torque correction control (driving force correction control) that controls the operation of the driving apparatus 40 according to the corrected torque command (S19).

Next, a third method for backlash compensation will be described with reference to FIG. 6.

In the backlash compensation method of FIG. 6, the control input value for controlling the wheel slip is determined by use of pre-compensation speed of the motor information, a dead zone for determining wheel slip is set by use of a dead zone threshold determined as the function value of the backlash speed, and then the determined control input value and dead zone are used for controlling wheel slip. Accordingly, it is possible to use a method in which the value determined as the function value of the backlash speed is set as a threshold value to validate only a component whose control input value exceeds the threshold value.

In more detail, as shown in FIG. 6, when the known slip control condition is satisfied (S11), the controller is configured to obtain the real-time driving system speed information through the sensor 10 (S12). For example, the driving system speed may be the speed of the motor.

Accordingly, the controller is configured to determine a reference speed for controlling slip control (S13'), and utilizes the obtained driveline speed to determine a control input value (S14'). Here, the control input value may be a speed error value which is a difference value between the obtained driving system speed and the determined reference speed.

Alternatively, the control input value may be a driving system equivalent inertia value which is determined by use of the obtained driving system speed and the torque command of the driving system. Alternatively, the control input value may be a wheel slip amount obtained from the obtained driving system speed and the determined reference speed, or an error of an observation speed obtained from the driving system model by use of the driving system speed information and the torque command value. Accordingly, the controller is configured to determine the speed of the backlash component, that is, the backlash speed as described above (S15'). Accordingly, the controller utilizes the determined backlash speed to determine a threshold for determining wheel slip by (S16"). In the instant case, the threshold for determining wheel slip (i.e., the dead zone threshold) may be the backlash speed itself, or may be determined as a function value of the backlash speed. When the function value is used, a function expression configured for using the backlash speed as an input variable to determine the threshold value may be used to determine the threshold value.

Hereafter, during the wheel slip control process, the controller is configured to compare the determined control input value with the determined threshold value (S17). When the control input value exceeds the threshold value, the controller is configured to determine that the vehicle wheel slip occurs, and determines a torque (driving force) correction amount (S18).

The torque correction amount may be, in the controller, determined as a value corresponding to the corrected control input value or a value corresponding to a difference value subtracting the threshold value from the corrected control input value, by setting data. In the instant case, the setting data of the controller may be a map or a formula configured for using the corrected control input value or the difference value subtracting the threshold from the corrected control input value as an input variable to obtain the torque correction amount corresponding to the control input value or the difference value.

When the torque correction amount is determined as described above, the controller is configured to correct the torque command of the driving apparatus 40 by the determined torque correction amount, and then performs torque correction control (driving force correction control) that controls the operation of the driving apparatus 40 according to the corrected torque command (S19).

Figure 7:
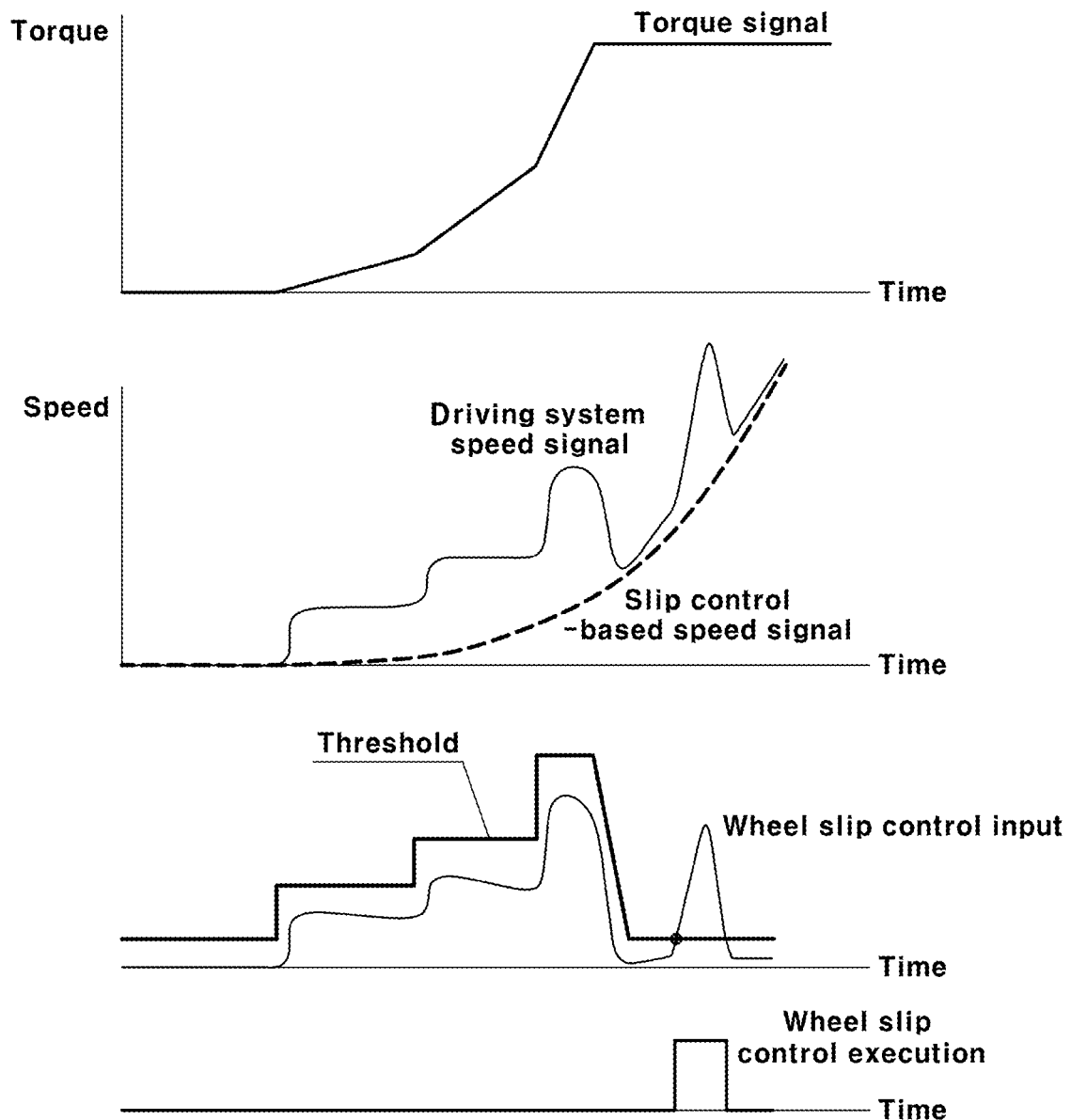
FIG. 7 is a view exemplarily illustrating a wheel slip control state in consideration of backlash according to various exemplary embodiments of the present invention.

FIG. 7 is a view exemplarily illustrating a wheel slip control state in consideration of backlash according to various exemplary embodiments of the present invention, and shows an example of the wheel slip control method shown in FIG. 6.

Referring to FIG. 7, a torque signal indicating a torque command of the driving apparatus 40 determined in the controller based on the vehicle driving information, a driving system speed signal indicating the driving system speed detected by the sensor 10, and a reference speed signal representing a reference speed for controlling wheel slip are exemplified.

Furthermore, a threshold value determined as a function value of the speed (backlash speed) corresponding to a backlash component is exemplified, and the 'S' section is a wheel slip control invalidation section in which an increase in the control input value is detected but the control input value did not exceed the threshold value, so that wheel slip control is not performed. On the other hand, when the control input value exceeds the threshold value, the wheel slip control is performed.

Accordingly, the present invention performs wheel slip control in which a backlash component is removed from driving system speed information of a vehicle, effectively preventing a decrease in control performance due to the backlash component, and furthermore, ensuring the stability and driving performance of the vehicle.

According to a method for controlling wheel slip according to various exemplary embodiments of the present invention, it is possible to prevent unwanted deterioration of acceleration performance and generation of vibrations caused by backlash.

When the backlash component included in the driving system speed information is not distinguished from wheel slip, wheel slip correction control is often performed due to backlash even though wheel slip did not occur, and in the instant case, driving force is reduced by the wheel slip correction control. Accordingly, acceleration performance is lowered, and a driving force profile that does not follow a required driving force command is generated, so that longitudinal vehicle vibration is generated. Therefore, the above problems may be prevented by clearly distinguishing backlash from wheel slip as in various exemplary embodiments of the present invention.

Furthermore, according to the method for controlling wheel slip of the present invention, it is possible to prevent deterioration of wheel slip control performance caused by backlash.

In a wheel slip control strategy using the existing driving system speed information, wheel slip correction control is implemented only when a driving system speed error greater than that in a backlash occurrence situation to prevent a situation in which the wheel slip correction control enters erroneously due to backlash. As a result, control cannot be performed at the initial stage of wheel slip, and control starts only when wheel slip greater than a certain level occurs. Accordingly, the ability to respond to wheel slip or the ability to suppress wheel slip is inevitably limited. Therefore, the above problem may be prevented by clearly distinguishing backlash from wheel slip as in various exemplary embodiments of the present invention.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can further be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling wheel slip of a vehicle, the method comprising:
   obtaining, by a controller, operation state information of a driving system including a drive apparatus configured for driving the vehicle;
   determining, by the controller, a speed corresponding to a backlash value between the drive apparatus and a drive wheel of the vehicle based on the obtained operation state information of the driving system;
   determining, by the controller, a reference speed of the vehicle for controlling the wheel slip;
   determining, by the controller, a control input value for controlling the wheel slip based on a driving system speed included in the obtained operation state information of the driving system, the determined speed corresponding to the backlash value, and the determined reference speed;
   using, by the controller, the determined control input value to determine whether the wheel slip occurs;
   determining, by the controller, a torque of the drive apparatus from vehicle driving information;
   determining, by the controller, a torque correction amount based on the control input value when the controller concludes that the wheel slip has occurred; and
   correcting, by the controller, a torque command of the drive apparatus according to the determined torque correction amount.

2. The method of claim 1, wherein in the determining the speed corresponding to the backlash value, the operation state information of the driving system includes at least one of the torque of the drive apparatus, a torque change gradient of the drive apparatus, a speed of the driving system, and a temperature of the driving system, and
   the speed corresponding to the backlash value, is determined from a map that utilizes the operation state information of the vehicle as an input variable of the map.

3. The method of claim 2, wherein the drive apparatus is a motor, the driving system speed is a speed of the motor, and the temperature of the driving system is a temperature of the motor.

4. The method of claim 1, wherein in the determining the speed corresponding to the backlash value, the operation state information of the driving system is the torque of the drive apparatus, and the speed corresponding to the backlash value, is determined as a value obtained by multiplying a torque change gradient of the driving apparatus and a preset proportional constant.

5. The method of claim 1, wherein in the determining the speed corresponding to the backlash value, the operation state information of the driving system is the torque of the drive apparatus,
   the speed corresponding to the backlash value, is obtained from a speed profile triggered by a friction torque threshold of a relay function, and
   the speed profile is a speed profile set in a form of increasing or decreasing with a preset slope and a preset peak value when the torque of the drive apparatus reaches a preset upper friction threshold or a preset lower friction threshold value.

6. The method of claim 1, wherein the driving system speed is at least one among a rotation speed of the drive apparatus, a rotation speed of the drive wheel, a rotation speed of an integrated starter and generator configured to be connected an engine to transmit power, a rotation speed of a transmission input shaft, a rotation speed of a transmission output shaft, and a rotation speed of a driveshaft.

7. The method of claim 1, wherein the drive apparatus is a motor.

8. The method of claim 1, wherein in the determining the control input value for controlling the wheel slip, the driving system speed among the operation state information is corrected by use of the speed corresponding to the backlash value, and
   the control input value for controlling the wheel slip is determined based on a corrected driving system speed and the reference speed.

9. The method of claim 8, wherein when the driving system speed is corrected, the driving system speed is corrected by subtracting the speed corresponding to the backlash value, the driving system speed.

10. The method of claim 8, wherein a speed error value which is a difference between the corrected driving system speed and the reference speed is determined as the control input value.

11. The method of claim 8, wherein in the determining whether the wheel slip occurs, the controller is configured to compare the determined control input value with a preset threshold value and to conclude that the wheel slip has occurred when the control input value exceeds the preset threshold value.

12. The method of claim 11, wherein in the determining the torque correction amount, the torque correction amount is determined as a value obtained by subtracting the threshold value from the control input value with a map or a preset formula.

13. The method of claim 1, wherein in the determining the torque correction amount, the torque correction amount is determined as a value corresponding to the control input value based on a map or a preset formula.

14. The method of claim 1, wherein in the determining the control input value for controlling the wheel slip, a pre-correction control input value for controlling the wheel slip is determined by use of the driving system speed or by use of the driving system speed and the reference speed,
   the determined pre-correction control input value for controlling the wheel slip is corrected by use of the speed corresponding to the backlash value, and
   the corrected control input value is determined as a final control input value for determining whether the wheel slip occurs.

15. The method of claim 14, wherein a speed error value, which is a difference between the driving system speed and the reference speed, is determined as the pre-correction control input value.

16. The method of claim 14, wherein at least one among a driving system equivalent inertia determined by use of the driving system speed and the torque command of the driving system, a wheel slip amount determined by use of the driving system speed and the reference speed, and an error of an observation speed obtained from a driving system model by use of driving system speed information and a torque command value is determined as the pre-correction control input value.

17. The method of claim 14, wherein when the control input value is corrected, the control input value is corrected by subtracting the speed corresponding to the backlash value, from the pre-correction control input value or subtracting a corrected backlash correction amount determined as a function value of the speed corresponding to the backlash value, from the pre-correction control input value.

18. The method of claim 1, further including determining, by the controller, a threshold value for determining the wheel slip as a function value of the determined speed corresponding to the backlash value,
wherein in the determining whether the wheel slip occurs, the controller is configured to compare the determined control input value with the determined threshold value, and the controller is configured to conclude that the wheel slip has occurred when the control input value exceeds the threshold value.

19. The method of claim 18, wherein in the determining the control input value for controlling the wheel slip, a speed error value, which is a difference between the driving system speed and the reference speed, is determined as a pre-correction control input value.

20. The method of claim 18, wherein in the determining the control input value for controlling the wheel slip, at least one among a driving system equivalent inertia determined by use of the driving system speed and the torque command of the driving system, a wheel slip amount determined by use of the driving system speed and the reference speed, and an error of an observation speed obtained from a driving system model by use of driving system speed information and a torque command value is determined as the pre-correction control input value.

21. A method for controlling wheel slip of a vehicle, the method comprising:
    obtaining, by a controller, operation state information of a driving system including a drive apparatus configured for driving the vehicle;
    determining, by the controller, a speed corresponding to a backlash value between the drive apparatus and a drive wheel of the vehicle based on the obtained operation state information of the driving system;
    determining, by the controller, a reference speed of the vehicle for controlling the wheel slip;
    determining, by the controller, a control input value for controlling the wheel slip based on a driving system speed included in the obtained operation state information of the driving system, the determined speed corresponding to the backlash value, and the determined reference speed;
    using, by the controller, the determined control input value to determine whether the wheel slip occurs;
    determining, by the controller, a torque of the drive apparatus from vehicle driving information;
    determining, by the controller, a torque correction amount based on the control input value when the controller concludes that the wheel slip has occurred; and
    correcting, by the controller, a torque command of the drive apparatus according to the determined torque correction amount,
    wherein the wheel slip is controlled by use of the driving system speed from which the speed corresponding to the backlash value is removed after the speed corresponding to the backlash value is removed from the driving system speed.

\* \* \* \* \*